(12) United States Patent
Nirmel

(10) Patent No.: US 9,119,444 B2
(45) Date of Patent: Sep. 1, 2015

(54) VERSATILE HOOK-AND-LOOP FASTENER SYSTEM

(76) Inventor: Chittaranjan Narandas Nirmel, Warfordsburg, PA (US)

(*) Notice: Subject to any disclaimer, the term of this patent is extended or adjusted under 35 U.S.C. 154(b) by 1151 days.

(21) Appl. No.: 12/387,335

(22) Filed: May 1, 2009

(65) Prior Publication Data

US 2010/0319167 A1  Dec. 23, 2010

(51) Int. Cl.
*A44B 18/00* (2006.01)
*B60J 1/20* (2006.01)
*B60R 13/02* (2006.01)
*E06B 9/44* (2006.01)
*F16B 5/07* (2006.01)
*B60R 11/00* (2006.01)

(52) U.S. Cl.
CPC ......... *A44B 18/0084* (2013.01); *A44B 18/0088* (2013.01); *B60J 1/2091* (2013.01); *B60R 13/0206* (2013.01); *E06B 9/44* (2013.01); *F16B 5/07* (2013.01); *B60R 13/0218* (2013.01); *B60R 2011/0063* (2013.01); *B60R 2011/0077* (2013.01); *E06B 2009/445* (2013.01); *Y10T 24/27* (2015.01); *Y10T 24/2708* (2015.01)

(58) Field of Classification Search
CPC ............ A44B 18/0084; A44B 18/0088; B60J 1/2091; B60R 13/0206; B60R 13/0218; B60R 2011/0063; B60R 2011/0077; E06B 2009/445; E06B 9/44; F16B 5/07; Y10T 24/27; Y10T 24/2708
USPC ........... 24/306, 442, 445, 447, 448, 449, 450, 24/452, 30.5 R, 446
See application file for complete search history.

(56) References Cited

U.S. PATENT DOCUMENTS

| | | | | | |
|---|---|---|---|---|---|
| 3,543,977 | A | * | 12/1970 | Lockridge | 224/222 |
| 3,686,718 | A | * | 8/1972 | Brumlik | 24/447 |
| 4,596,540 | A | * | 6/1986 | F'Geppert | 474/253 |
| 4,617,214 | A | * | 10/1986 | Billarant | 428/40.1 |
| 4,815,172 | A | * | 3/1989 | Ward | 24/16 R |
| 5,098,324 | A | * | 3/1992 | Isono et al. | 441/75 |
| 5,200,245 | A | * | 4/1993 | Brodrick, Jr. | 428/100 |
| 5,537,793 | A | * | 7/1996 | Murasaki | 52/585.1 |
| 5,548,871 | A | * | 8/1996 | Trethewey | 24/16 R |
| 5,640,744 | A | * | 6/1997 | Allan | 24/442 |
| 5,672,404 | A | * | 9/1997 | Callahan et al. | 428/100 |
| 5,691,027 | A | * | 11/1997 | Eckhardt et al. | 428/100 |
| 5,786,062 | A | * | 7/1998 | Callahan et al. | 428/100 |
| 6,086,973 | A | * | 7/2000 | Hazes | 428/40.1 |
| 6,205,623 | B1 | * | 3/2001 | Shepard et al. | 24/30.5 R |
| 6,399,852 | B1 | * | 6/2002 | Barron | 602/41 |
| 6,776,528 | B2 | * | 8/2004 | Wills | 383/15 |

(Continued)

*Primary Examiner* — Robert J Sandy
*Assistant Examiner* — David Upchurch

(57) ABSTRACT

An improved hook and loop fastener system enables fastening to each other of two objects each provided solely with respective pluralities of flexible loops via an intermediate connection element that has two faces each provided solely with flexible hooks and is sandwiched between the two objects. The intermediate connection element can be easily removed and washed separately as needed, for example when either or both of the objects are to be washed with other fibrous objects, to eliminate the likelihood of the hooks inadvertently engaging with and ripping off any ambient fibers that could then clog the hooks and diminish their future performance. Selective retention of the intermediate connection element in engagement with only one of the two objects leaves the other object free of hooks and thus safely contactable by ambient objects that contain frangible fibers.

4 Claims, 3 Drawing Sheets

(56) References Cited

U.S. PATENT DOCUMENTS

| | | | |
|---|---|---|---|
| 7,132,144 B2* | 11/2006 | Roberts | 428/40.2 |
| 7,185,473 B2* | 3/2007 | Pacione | 52/747.11 |
| 7,530,634 B1 | 5/2009 | Mortazavi et al. | |
| 2002/0078536 A1* | 6/2002 | Martin et al. | 24/450 |
| 2003/0051320 A1* | 3/2003 | Fagan et al. | 24/584.1 |
| 2003/0150087 A1* | 8/2003 | Dieterich | 24/306 |
| 2005/0091804 A1* | 5/2005 | Joosten et al. | 24/442 |
| 2007/0124899 A1* | 6/2007 | Israel et al. | 24/306 |
| 2008/0243173 A1* | 10/2008 | Thorpe | 606/203 |

* cited by examiner

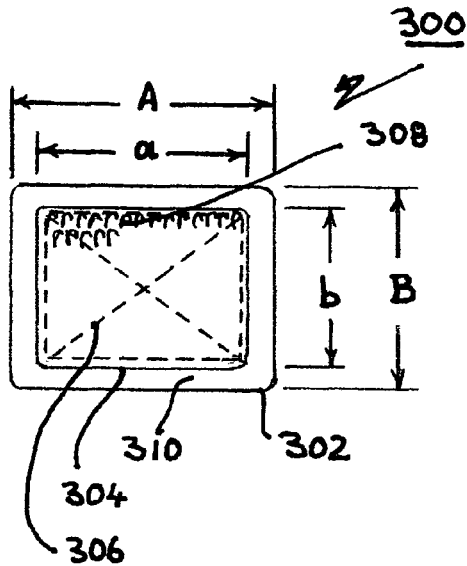
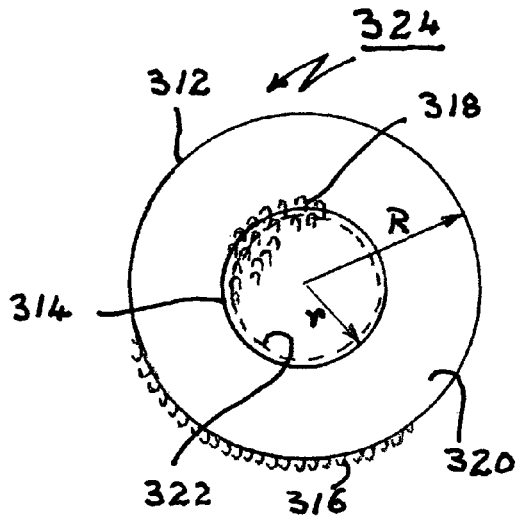
FIG. 3(A)          FIG. 3(B)
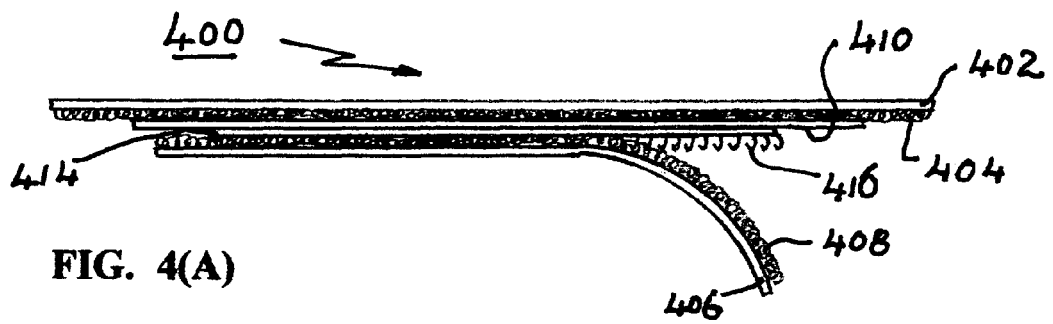
FIG. 4(A)
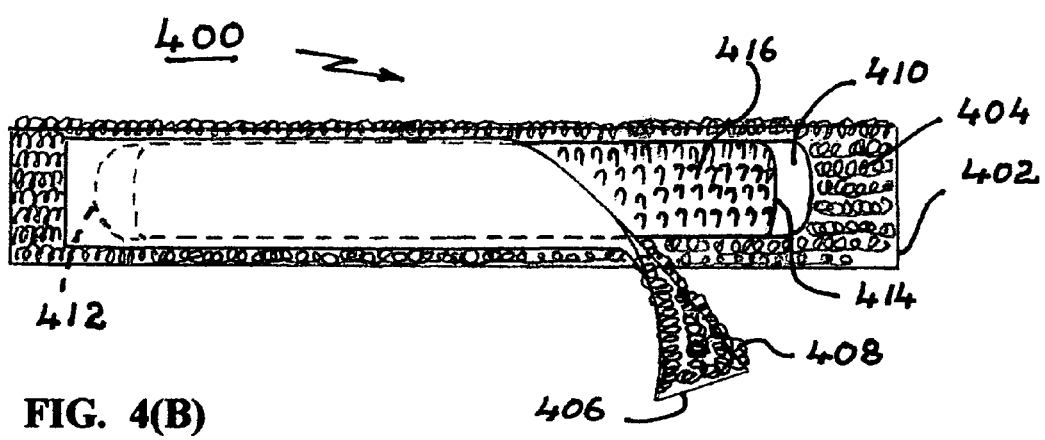
FIG. 4(B)

VERSATILE HOOK-AND-LOOP FASTENER SYSTEM

FIELD OF THE INVENTION

This invention relates to an improved and versatile system that enables temporary fastening of objects to each other by pressed engagement of respective pluralities consisting solely of flexible loops or solely of flexible hooks on both objects. More particularly, this invention relates to an improved and versatile system that enables temporary fastening of objects each provided with a respective plurality consisting solely of flexible loops or solely of flexible hooks, to each other, via an intermediate element provided with corresponding pluralities consisting solely of flexible hooks or solely of flexible loops on opposite sides.

BACKGROUND OF THE RELATED ART

The well-known hook and loop fastening system, e.g., the commercial product widely marketed under the mark "VELCRO"™, basically consists of a large first plurality of flexible hooks provided on a first substrate and a matching large second plurality of flexible loops provided on a second substrate for pressed engagement between them. For convenience of use, the substrates customarily are sold together as sets, often in the form of strips of matching width and length or, alternatively, as similarly sized and shaped circular or square elements. The hooked and looped portions of such a system typically are separately secured to two objects that are temporarily fastened to each other by pressed simultaneous engagement of a substantial number of the hooks to a substantial number of the loops. The loops typically are more flexible than the hooks.

The substrates may each be provided with adherent on their sides opposite to the hooks or loops, the user thereby being enabled to adhere the respective cooperating substrate portions to the two objects that may then be pressed to each other to cause the intended engagement between the pluralities of hooks and loops. Such an embodiment is particularly suited for attachment of relatively stiff-sided objects, e.g., a soap dish to a shower wall in a bathroom.

In another embodiment of the system, particularly suited for applications involving soft-sided objects comprising fabrics or flexible sheets, the cooperating substrates are each sewn to respective portions of the same object, e.g., either the hook or the loop element to the outside of a pocket and the other cooperating element to a pocket flap to cover the pocket securely. This is a very popular usage of the existing hook and loop fastener system, particularly on garments, pillow covers, purses and wallets, diapers, open-weave bandages, soft luggage such as backpacks, and the like.

Yet another popular use for the hook and loop fastener system is to temporarily locate soft fabric items in selected relationship with other fabric items, e.g., headrest covers on upholstered furniture, aircraft, bus or train seats, sofa pillows on sofa frames, player identification numbers on sports uniforms, etc.

A serious problem arises, however, when items such as garments or headrest covers provided with hook fastener elements are washed with relatively soft and generally fluffy items such as towels and bathrobes, cottons sweaters, flannel bed linens, etc., because the hooks tend to engage and often rip off fibers from the materials of the soft fluffy items. While such undesirable engagement may often occur when the materials are dry, the problem is aggravated when the contacted fibers are wet and are repeatedly forced against the hooks, e.g., in a washing machine. The ripped-off fibers eventually clog the hooks and significantly deteriorate their capacity to engage thereafter with their loop counterparts for their intended use; and the items from which the fibers were ripped off tend to weaken and/or look damaged. The problem arises simply because in known hook and loop fastening systems employed with garments or the like there is always present a plurality of hooks provided to cooperate with every plurality of loops.

In the example of headrest covers, e.g., for use on upholstered furniture, or on aircraft, bus or train seats, the preference typically is to provide the hooks on the removable cover so that even if the cover is absent passengers will not find their hair entangled in hooks that otherwise would have to be located at about head level on the seat backs. The covers have to be cleaned frequently for hygienic reasons, and if the hooks provided on them become clogged with fibers snagged from cover material contacted during the washing process then their utility is eventually compromised.

Even with an embodiment in which either the hook and/or the loop element is provided on a relatively stiff surface, on an item not normally washed with soft fluffy items, there may be occasional problems, e.g., if the hook element is attached to a bathroom wall and a person with long wet hair happens to contact the hair to the hooks the hooks may rip off some of the wet hair.

A definite need therefore exists for a solution that will eliminate such problems arising from inadvertent engagement of the hooks in hook and loop fastener systems with ambient fibers, e.g., with a person's hair, and/or with sources of fibers like cloth upholstery, loosely woven curtains, dander from long-haired pets, or the like.

The present invention addresses this need, and provides a versatile and improved hook and loop fastening system with which users can easily avoid and/or minimize these and similar problems in a wide variety of applications.

SUMMARY OF THE INVENTION

It is a principal object of this invention to provide an improved hook and loop fastening system that enables a user to connect a first object which is provided only with a plurality of flexible loops (or only with a plurality of flexible hooks) to another similarly provided object via an intervening connection element that is correspondingly provided only with pluralities of flexible hooks (or flexible loops) on opposite sides.

This object is realized by providing an improved hook and loop system for fastening a first plurality of flexible loops provided on a first substrate to a second plurality of flexible loops provided on a second substrate, the system comprising a third substrate having first and second faces with a first plurality of hooks provided on a first face and a second plurality of hooks provided on a second face on the opposite side.

It is another object of this invention to provide a hook and loop fastening system comprising a connection element that has first and second pluralities each consisting only of flexible hooks and respectively disposed on opposite sides of a shared substrate, whereby a first object provided only with a first plurality of flexible loops can be connected to a second object provided only with a second plurality of flexible loops, via the connection element, when the flexible hooks of the connection element are sandwiched between the flexible loops of the first and second objects.

This object is realized by providing an improved hook and loop fastening system in which a first plurality of flexible loops provided on a first object is fastened to a second plurality of flexible loops provided on a second object, via a connecting element provided with first and second pluralities of hooks on respective first and second faces opposite each other, when the connection element is sandwiched between the first and second objects so that the first plurality of hooks engages with the first plurality of flexible loops and the second plurality of hooks simultaneously engages with the second plurality of loops.

It is another object of this invention to provide a hook and loop fastening system comprising at least one connection element that has first and second pluralities each consisting only of flexible loops and respectively disposed on opposite sides of a shared substrate, whereby a first object provided only with a first plurality of flexible hooks can be connected to a second object provided only with a second plurality of flexible hooks, via the connection element, when the flexible loops of the connection element are sandwiched between the flexible hooks of the first and second objects.

In another aspect of this invention, there is provided a method of connecting a first object provided with a first plurality consisting only of loops to a second object provided with a second plurality also consisting only of loops, by sandwiching between the respective pluralities of loops of the first and second objects an intervening connection element that is provided with first and second pluralities each consisting only of hooks and disposed on opposite sides of the connection element.

This object is realized by providing an improved method of fastening a first object to a second object, wherein the objects have respective first and second pluralities each consisting solely of loops, comprising the step of sandwiching between the first and second objects a connection element having first and second faces with a first plurality of hooks provided on the first face and a second plurality of hooks provided on the second face, so that the first plurality of hooks engages with the first plurality of loops and the second plurality of hooks simultaneously engages with the second plurality of loops.

In another aspect of this invention, there is provided a method of connecting a first object provided with a first plurality consisting only of hooks to a second object provided with a second plurality also consisting only of hooks, by sandwiching between the respective pluralities of hooks of the first and second objects an intervening connection element that is provided with first and second pluralities each consisting only of loops and disposed on opposite sides of the connection element.

These and other related objects of this invention will be better understood from the following detailed description with reference to the drawing figures.

BRIEF DESCRIPTION OF THE DRAWING

FIG. 3A is a top plan view of a third embodiment of the claimed invention, wherein the connection element has a nearly square shape and the area of the plurality consisting solely of hooks on one (the top) side is smaller in both width and length than is the counterpart area of the plurality consisting solely of hooks on the opposite (the bottom) side. The connection element comprises two substrates shown sewn to each other by peripheral and diagonal stitching.

FIG. 3B is a top perspective view of a fourth embodiment of the claimed invention, wherein the connection element has a circular shape for each of the unequal areas consisting solely of hooks provided on its opposite sides. This connection element is also shown as comprising two substrates sewn to each other by peripheral stitching.

FIG. 4A is a side elevation view of the basic improved hook and loop connection system disposed for use according to the claimed invention, wherein a connection element provided on its opposite sides with respective pluralities consisting solely of hooks is shown partially sandwiched in simultaneous engagement with corresponding pluralities of loops provided on each of two elements thereby fastened to each other.

FIG. 4B is a bottom plan view of the arrangement shown in FIG. 4A, with the partially engaged loop element shown bent back farther to more fully expose the connection element.

DETAILED DESCRIPTION OF THE PREFERRED EMBODIMENTS

Figure 1:
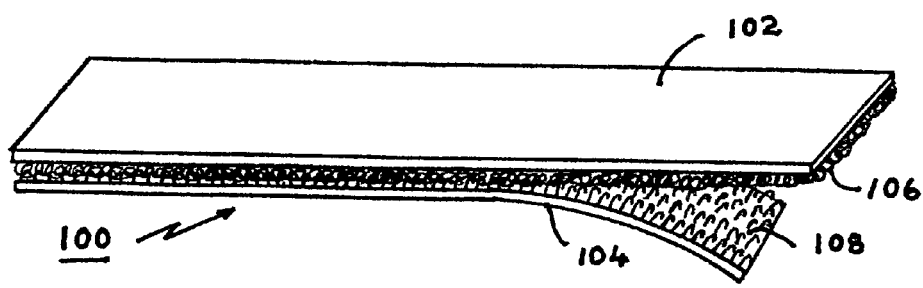
FIG. 1 is a perspective view of a known hook and loop fastener system in which a first element provided solely with a plurality of loops is shown in partial engagement with a second element provided solely with a plurality consisting solely of cooperating hooks.

As best seen in FIG. 1, the known hook and loop fastening system 100 comprises two cooperating, usually similarly shaped and sized, elements 102 and 104 that typically are individually secured to two objects (not shown for simplicity) that may be temporarily fastened to each other when the plurality of loops 106 on element 102 are forcibly engaged with the plurality of hooks 108 on element 104. This forcible engagement is obtained by the user applying moving pressure over the two elements toward each other, whereby the relatively more flexible loops 108 arbitrarily flex and become engaged by locally contacted hooks 106. Not every loop or hook is necessarily so engaged, but the combined engagement of a substantial number (typically hundreds) of loops and hooks provides sufficient engagement force to serve most fastening purposes—especially in shear.

Disengagement of the fastened elements 102 and 104 from each other (and thus of the two objects to which they are respectively secured) is readily obtained simply by pulling them apart to cause their physical separation by disengagement of the flexible loops from the hooks that they had previously engaged. Both the hooks and the loops may temporarily and elastically distort in this process.

Elements 102 and 104 are most conveniently secured to their respective objects either by adhesion (preferred for relatively stiff-sided objects such as a soap-dish and a bathroom tile), or by sewing (via machine-stitching onto a manufactured product like a fabric garment or backpack). They are readily manufactured, using known processes, in a variety of geometric forms—most commonly as strips or ribbons typically half to three-quarters of an inch in width and in lengths of many feet. The loops or hooks are typically formed integrally with the supporting substrate, and may be made in a number of known ways from moldable, strong, and durable plastics materials in a variety of strengths and colors.

As noted above, when the hooks 108 of such a known hook and loop system inevitably contact fibers such as hair, pet dander, wet or dry soft cotton and the like in normal use, the hooks naturally tend to snag these ambient fibers. This, unfortunately, is a consequence of the functional property that causes hooks 108 to be used in the first place—that they can readily engage with the flexible loops 106 when desired. The hook-clogging problem is particularly aggravated when the inadvertently contacted fibers are wet, e.g., in a washing or drying machine, when the wet and/or heated snagged fibers may be softer, perhaps weaker, and more likely to break off from their parent material/object. The snagged broken fibers (not shown for simplicity) usually tend to accumulate and soon clog the spaces between adjacent closely spaced hooks, making it difficult for the somewhat more flexible loops 106 to subsequently establish adequate engagement with hooks 108. This eventually compromises the utility of the known fastening system 100, and it is practically impossible to remove the clogging fibers to restore the lost functionality of the hooks once this happens.

A very simple solution to this problem is provided by the disclosed invention. It allows the user to physically remove and thus totally isolate the hooks until and unless their presence is absolutely necessary, i.e., it allows a user to have them present only when they are to be actively employed for their intended purpose of engaging with the loops. This is done in a convenient, inexpensive and reliable manner without compromising the safe and easy fastening facility of the known hook and loop system. Numerous variations and enhancements of the original/basic hook and loop fastening mechanism have been developed over the years, and the improvements according to the present invention are readily adaptable to most of these applications. Furthermore, this invention requires virtually no modification of known technology for manufacturing the hook and loop elements in various useful forms, colors and materials.

Figure 2A:
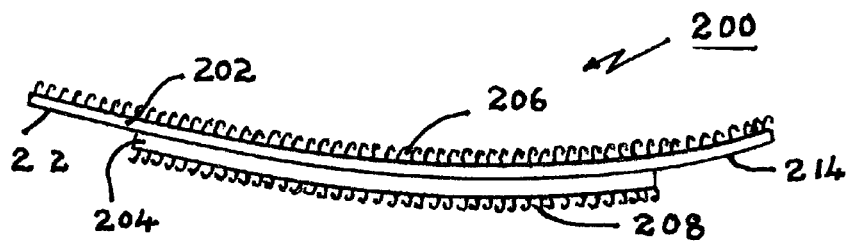
FIG. 2A is a side view of a first embodiment of the claimed invention in which a substrate (shown curved in an exemplary unengaged disposition) is provided with respective unequal pluralities consisting solely of hooks on each of its two opposite sides.

According to the first preferred embodiment, as best understood with reference to FIG. 2A, a connection element 200 (for most established applications) may have a generally strip-like shape and size selected to closely match those of comparable known hook and loop system components. It may, in its easiest-to-manufacture form, comprise two conventional substrates, 202 and 204, each of which is provided with a plurality consisting solely of hooks, namely 206 and 208 respectively. Depending on the substrate material and/or the versatility of the manufacturer, substrates 202 and 204 may be manufactured integral with each other. In another alternative, they may be thermally fused to each other if made from a suitable material. In yet another alternative, substrates 202 and 204 may be sewn to each other by stitching with a strong thread (not shown for simplicity, but similar to the stitching shown in FIGS. 3A and 3B for alternative geometries) around the periphery of the smaller element 204. Such manufacturing specifics are considered well within the competency of persons of ordinary skill in the manufacturing arts.

Figure 2B:
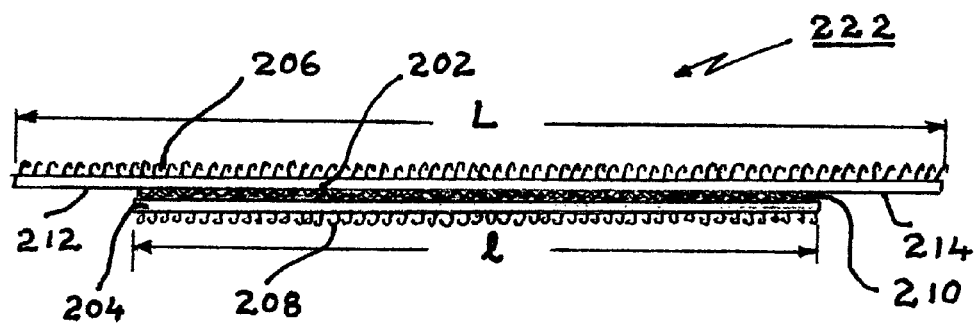
FIG. 2B is a side elevation view of a second embodiment of the claimed invention in which a connection element is formed by adhering to each other two substrates of unequal length, each substrate being provided with a respective plurality consisting solely of hooks, the substrates being adhered to each other by an adherent layer that extends only over the area of the smaller of the two substrates.
Figure 2C:
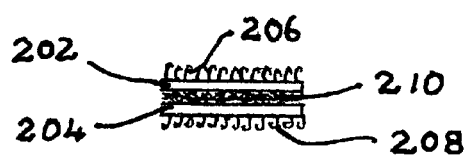
FIG. 2C is an end elevation view of the connection element per FIG. 2B.

Some known hook and/or loop elements are manufactured with a strong adhesive coating or layer on the sides free of hooks or loops. Connection element 222, in a second preferred embodiment best understood with reference to FIGS. 2B and 2C, is generally similar to connection element 200 but is formed from two substrates 202 and 204, each respectively provided with a plurality consisting solely of hooks 206 and 208, respectively, adhered to each other by a layer 210 comprising suitable adherent material. As a practical matter, it would be convenient to use a length "l" of a known adherent-inclusive hooked element 204 and adhere it directly to a length "L" of an adherent-free hooked element 202 to form connection element 222.

It is preferable to have the length "L" of substrate portion 202 longer than the length "l" of substrate portion 204, and optionally to have the difference divided equally to form similar adherent/stitching free end portions 212 and 214 at either end, for ease of use as will be understood from details of the method of use as discussed below. This, while preferable, is not essential, and connection elements of any geometry may each be formed to have unequal areas of hooks on their opposite sides. Other geometries for the hooked and looped elements may be found preferable for particular applications.

Thus, for example, the connection element 300 per the third embodiment, as best seen in FIG. 3A, comprises approximately square substrate elements 302 and 304 sewn to each other by stitching 306 (which may include both peripheral and diagonal segments as indicated). Both elements 302 and 304 are provided with respective pluralities consisting solely of hooks such as 308 (the hooks on substrate 302 are not visible in FIG. 3A). By appropriate choice of dimensions, such as "a", "b", "A" and "B", a peripheral hook-free zone may be readily created in this embodiment to serve the same purpose as hook-free zones 212 and 214 in the second embodiment.

The fourth embodiment 324, per FIG. 3B, comprises circular substrates 312 and 314, respectively provided with pluralities each consisting solely of hooks 316 and 318, symmetrically attached to each other by peripheral stitching 322. By choice of their respective radii, "R" and "r", a peripheral hook-free zone 320 may be created for the same purpose as in the other embodiments.

As will be readily understood, forming an integral structure, thermal fusion, adherence, and stitching are merely examples of techniques for manufacturing the claimed connection element from readily available and currently basic substrate element forms. Other known techniques may also be employed as desired, as may other geometries in addition to those described above.

FIG. 4A (in side elevation view) and FIG. 4B (in a plan view) each show a first element 402 that has a plurality consisting solely of loops 404 and a second element 406 that has a plurality consisting solely of loops 408. A smaller connection element 200 disposed between them comprises a first substrate portion 410 provided with a first plurality consisting solely of hooks 412 and a second substrate portion 414 provided with a second plurality consisting solely of hooks 416. When elements 402 and 406 are firmly pressed toward each other, with connection element 200 "sandwiched" between them, a substantial number of loops 404 will be forced into engagement with adjacent hooks 412 and, simultaneously, a substantial number of loops 408 will be forced into engagement with hooks 416. Note that the objects that are thus to be fastened to each other, which would themselves be firmly attached to respective elements 402 and 406 in any known manner, are omitted from these figures for simplicity.

The strength of the fastening engagement thus obtained between elements 402 and 406 will be a function of the assorted physical dimensions, strength and number of actively engaged hooks and loops generally. More particularly, for a selected density of hook or loop distribution over a specific area, this engagement strength typically will be limited by the engaged area of the smaller of the two pluralities of hooks, i.e., 416 provided on connection element 200. This factor must be taken into consideration by the user in any particular application, and a number of relatively small-area connection elements 200 may have to be used instead of a single large one so long as the desired fastening strength is realized.

Unfastening of objects thus fastened to each other, e.g., a pocket-flap from its position covering a pocket of a garment or backpack, is effected simply by pulling apart the elements 402 and 406. As persons of ordinary skill in the mechanical arts will immediately appreciate, if substrate portions 410 and 412 of connection element 200 are of equal engaged area, and both have the same hook distribution density, then connection element 200 is equally likely to be end up engaged to either element 402 or element 406. In many situations involving repeated or prolonged use this might not matter very much, as in the example of a pocket-flap over a pocket opening. In other situations, e.g., if the system is used to fasten a headrest cover to the back of a sofa, it may be important that when the cover is pulled off it does not leave connection element 200 on the seat back where its exposed hooks might snag a person's hair before a replacement cover has been put in place to cover them.

A simple solution is to make connection element 200 (or for the same reason differently shaped connection elements such as 300, 324) such that there is at least one small hook-free zone such as 212 or 214 (see FIGS. 2A and 2B), 310 (see FIG. 3A) or 320 (see FIG. 3B). Thus, when solely-looped elements such as 402 and 406 are pulled apart the intermediate connection element 200 joining them until then should remain engaged with solely looped element 402 because the more numerous hooks 412 on its larger hooked-area side exercise a larger grip there. Separation will therefore be initiated between connection element 200 and looped element 406, as best understood with reference to FIGS. 4A and 4B, at the edge where loops 408 are thus more easily pulled apart from hooks 416. Furthermore, at least some users may find it easier to initiate the pulling-apart unfastening action by inserting a finger at the unhooked end portion of connection element 200 and then pulling away looped element 406 away from the more strongly engaged combination of connection element 200 and hooked element 402.

When the user decides to wash and then dry the object to which either of hooked elements 402 or 406 is secured he or she can easily peel off each connection element 200 and wash/dry it separately if desired. Washing/drying of the objects secured to looped elements 402 and 406 can then be done safely, i.e., without concern about any hooks that might inadvertently snag ambient fibers and lose their hooking capability and/or damage snagged items. Note that washing/drying a number of hooked elements only with each other should not pose any problems as the hooks being relatively stiff and of equal strength cannot snag each other in a damaging way.

It should be appreciated that while known systems employ hooks and loops of comparable size and similar materials, the claimed invention enlarges their versatility because hooked connection elements as taught herein can engage functionally with loops of a relatively wide range of thickness, stiffness and size. This provides, for example, the advantage that two loosely woven objects each of which inherently contains fiber loops, e.g., soft curtains of loose and open weave, even if of different material or thickness, can be directly fastened to each other by sandwiching between them a connection element that has pluralities of hooks on opposite sides. Another example of such an application is where a fabric-covered support surface e.g., in a classroom or a product exhibition booth, can be used to display a variety of lightweight objects like cashmere sweaters, scarves, or decorative appliques made of relatively open-weave material in a variety of display dispositions simply by sandwiching one or more hooked connection elements like 200 between them and the support fabric. That the loops inherently present in the support material and in the items supported thereto are different in size and stiffness should be of little consequence so long as enough hooks of the connection element(s) can engage with each of the displayed objects strongly enough for the desired temporary and limited support. The objects can be subsequently dismounted from the display surface carefully, and may be redisplayed by being reengaged to the hooked connection elements over and over again. Any damage to the displayed objects would thus be well-contained and unlikely to affect repeated displays, and would be a part of the cost of doing business.

A novel application of this invention is in the provision of opaque curtains to obtain privacy and exclude annoying ambient light from powerful outside light sources, e.g., for occupants resting in vehicles parked in well-lit highway rest areas at night.

Figure 5:
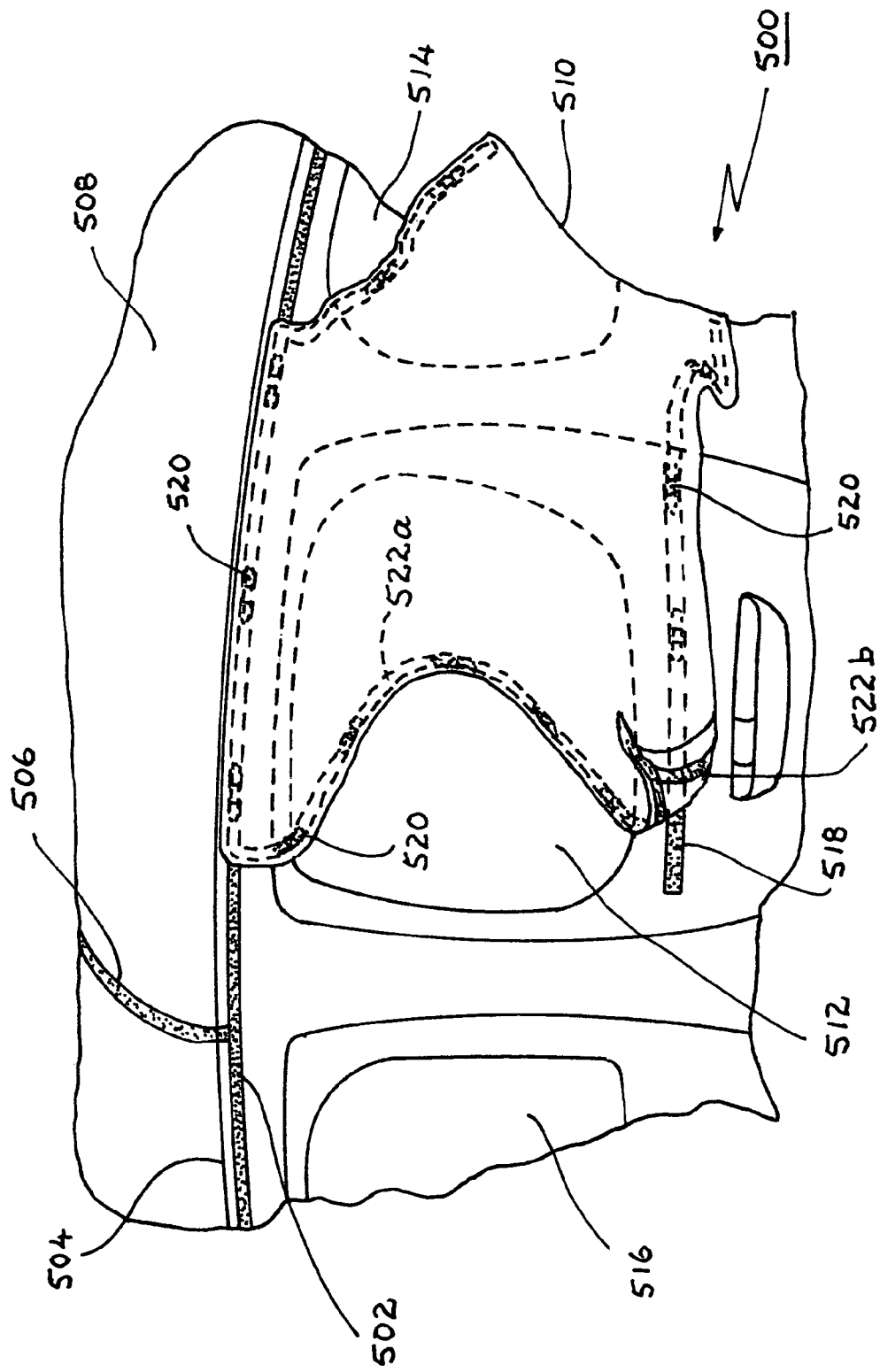
FIG. 5 is a partial perspective view of the interior of a vehicle equipped with a window curtain system utilizing the claimed invention.

In such a system 500, as best understood with reference to FIG. 5, there is adhered a first strip portion 502 of the fastening system according to this invention, in segments sized as appropriate and consisting solely of loops, at or just below the ceiling line 504 of the vehicle, e.g., a station-wagon, SUV or van. A part 506 of this strip may have to be adhered widthwise transversely across the headliner 508. Only relatively soft closed loops are thus in position to be contacted by passenger hair or soft fluffy garments when the curtains are not in use, so during vehicle operation for travel there should be no inconvenience arising from snagging of such ambient fibers. By suitable choice of color and quality, the looped strips 502, 506 can be effectively blended into the interior décor of the vehicle so as to be almost non-noticeable. Lightweight but adequately opaque curtain material 510, sized and shaped in segments disposable to match and block vision and light ingress through transparent glass windows 512, 514 and 516 of the vehicle may be provided with respective parts of a second strip portion 518 (also consisting solely of loops) to be disposed below the windows. A suitable number of intermediate connection elements 520, each having opposite sides provided solely with hooks, as previously described, may then be sandwiched between the curtain loops of strips 522a and 522b and the loops of strips such as 502, 506 and 518 to hang the curtain segments so as to block persons outside from looking in and ambient light from likewise bothering the vehicle occupants.

At the user's option, neighboring segments of the curtain 510 may be fastened to each other adjacent their vertical edges, to ensure reliable overlap for improved light and vision-blocking function, by providing additional looped elements united by corresponding hooked connection elements thereat in obvious manner. This scheme will allow a user to selectively disconnect/reconnect one or more curtain segments to exit/reenter the vehicle without compromising privacy or disturbing other occupants.

The connection elements 520 are preferably used with their larger hooked sides engaged to the curtain's looped strips 522a and 522b, so that when the user pulls the curtain segments away from the looped elements such as 502 and 518 adhered to the vehicle interior, to disengage them from their useful/mounted disposition, the connection elements 520 will all remain engaged to the curtain segments 510—leaving only the looped strips 502, 506 and 518 exposed at the vehicle's inside surface where they will not snag any ambient hair or garment fibers. The hooked connection elements 520 can be readily peeled off from looped strips 522a and 522b of curtain segments 510 and washed separately from the curtain material if there is a likelihood that the hooks might destructively engage with the curtain material fibers. Use of smooth, tightly-woven, curtain material will reduce or totally eliminate the hook-clogging problem if the curtains are not washed or dried with soft fluffy materials. One obvious alternative of this application, using only the known hook and loop system, would be to apply solely looped elements to the vehicle and solely hooked cooperating elements to such tightly-woven and smooth curtains and not washing/drying the curtains with soft fluffy materials.

It might occur to one that merely applying a solely looped element over a solely hooked element during the washing and drying portions of a wash cycle to cover up the hooks, in principle, could obviate the likelihood of the hooks inadvertently engaging with ambient soft fibers and becoming clogged. This is fine in theory, but the hard fact is that even if a very few hooks are not so covered they will engage with ambient fibers; and over time this will cause even more hooks to become exposed and involved in this undesirable process. An even greater problem associated with this putative solution is that the solely looped cover-up elements required must be larger than the solely hooked elements that they are to keep covered up or, at the very least they must be of the exact same shape and size and must perfectly cover the entirety of the hooked area to perform as required. By contrast, the size of the connection element according to the present invention is not so limited. Accordingly, this problem is much better, more definitely, and very simply solved by the present invention which totally removes all the hooks and keeps them far away from the loops when not actually required for their useful function—especially during a wash-and-dry cycle.

The inherent versatility of this invention is characterized by the fact that a given connection element, e.g., 200, can be safely and effectively employed to fasten objects that have their pluralities of loops disposed in areas of different shapes and sizes. Furthermore, by choice of hooks 206, 208 of different sizes on opposite sides, connection elements like 200 may even be used to comfortably and securely fasten objects to each other that are provided with respectively differently sized loops. In addition, any connection elements that a user loses over time can be inexpensively replaced, and need not necessarily be exact replacements. This invention thus significantly increases the functional utility of the basic hook and loop fastening system.

Finally, it is also important to appreciate that in purely mechanical terms the invention will perform its engaging function effectively if elements (like elements 402 and 406) that are themselves secured to objects to be fastened are provided solely with hooks and the connection element such as 200 sandwiched between them during use is provided solely with loops on opposite sides. Such an arrangement will not afford the benefit of avoiding clogging of the hooks during the kinds of uses described above, but may have value in certain applications, e.g., with objects that are free of fibers themselves and are unlikely to be exposed to significant amounts of ambient fibers.

Persons of ordinary skill in the related arts will no doubt consider other obvious variations and/or modifications of the invention as disclosed herein. The claims appended below are intended to comprehend the same.

The invention claimed is:

1. Means for fastening a first plurality of flexible loops provided on a first object to a second plurality of flexible loops provided on a second object, in a hook and loop fastening system, consisting of:
   a substrate having first and second faces;
   a first plurality of hooks, provided on the first face; and
   a second plurality of hooks, provided on the second face, wherein
      the first plurality of hooks covers a first area of the first face and the second
      plurality of hooks covers a second area of the second face, and
      the first area extends beyond the second area in at least one direction.

2. The means according to claim 1, wherein:
the first area is larger than the second area and surrounds the second area.

3. The means according to claim 1, wherein:
the substrate comprises two layers attached to each other, with the first and second pluralities of hooks respectively formed thereon and disposed for selective engagement with said first and second pluralities of loops.

4. The means according to claim 1, wherein:
the substrate comprises two layers attached to each other, with the first and second pluralities of hooks respectively formed thereon and disposed for simultaneous sandwiched engagement between selected portions of said first and second pluralities of loops.

* * * * *